(12) United States Patent
Gundall et al.

(10) Patent No.: US 7,497,517 B2
(45) Date of Patent: Mar. 3, 2009

(54) VEHICLE SEAT WITH LOWERED POSITION

(75) Inventors: Thomas Gundall, Queidersbach (DE); Andreas Closset, Rockenhausen (DE); Klaus Hassler, Mehlbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 105 days.

(21) Appl. No.: 11/637,285

(22) Filed: Dec. 12, 2006

(65) Prior Publication Data
US 2007/0138847 A1 Jun. 21, 2007

(30) Foreign Application Priority Data
Dec. 17, 2005 (DE) .................. 10 2005 060 444

(51) Int. Cl.
*A47C 1/12* (2006.01)
(52) U.S. Cl. .............. 297/334; 297/216.15; 297/378.12
(58) Field of Classification Search ................ 297/331, 297/334–336, 216.15, 216.16, 216.1, 378.12; 296/65.09, 65.13, 65.11
See application file for complete search history.

(56) References Cited

U.S. PATENT DOCUMENTS

| | | | | |
|---|---|---|---|---|
| 4,269,446 A | * | 5/1981 | Gersmann et al. | 297/341 |
| 6,000,742 A | * | 12/1999 | Schaefer et al. | 296/65.09 |
| 6,030,042 A | * | 2/2000 | Bauer et al. | 297/341 |
| 6,601,900 B1 | * | 8/2003 | Seibold | 296/65.09 |
| 6,655,738 B2 | | 12/2003 | Kämmerer | |
| 6,729,689 B2 | * | 5/2004 | Habedank | 297/335 |
| 6,964,452 B2 | | 11/2005 | Kämmerer | |
| 7,121,624 B2 | * | 10/2006 | Pejathaya et al. | 297/378.12 |
| 2002/0125753 A1 | * | 9/2002 | Kammerer | 297/331 |
| 2002/0130542 A1 | | 9/2002 | Ellerich et al. | |
| 2003/0030312 A1 | | 2/2003 | Hadedank | |

FOREIGN PATENT DOCUMENTS

| | | |
|---|---|---|
| DE | 100 45 474 C1 | 3/2002 |
| DE | 101 39 538 C1 | 3/2003 |
| DE | 103 28 176 B3 | 3/2005 |
| WO | WO 01/19640 A2 | 3/2001 |

\* cited by examiner

*Primary Examiner*—Laurie K Cranmer
(74) *Attorney, Agent, or Firm*—Womble Carlyle Sandridge & Rice, PLLC

(57) ABSTRACT

Vehicle seat, in particular a motor vehicle seat, with a seat part (3) that is linked to a support via a cushion-four-joint (42), a backrest that can be tilted and locked by at least one fitting and which is linked to the cushion-four-joint (42) through a link-four-joint (48), in which a linking member (41) is a common component of both four-joints (42, 48), wherein the vehicle seat at a minimum can be converted from at least one in-use position that is suited for passenger transport, to a folded together, not-in-use position, and between the seat part (3) and the support an additional securing device with leeway (53) is provided in the in-use position, wherein the leeway (53) defines the mobility of the cushion-four-joint (42) in the case of a crash and during a forward tilt adjustment of the backrest.

16 Claims, 2 Drawing Sheets

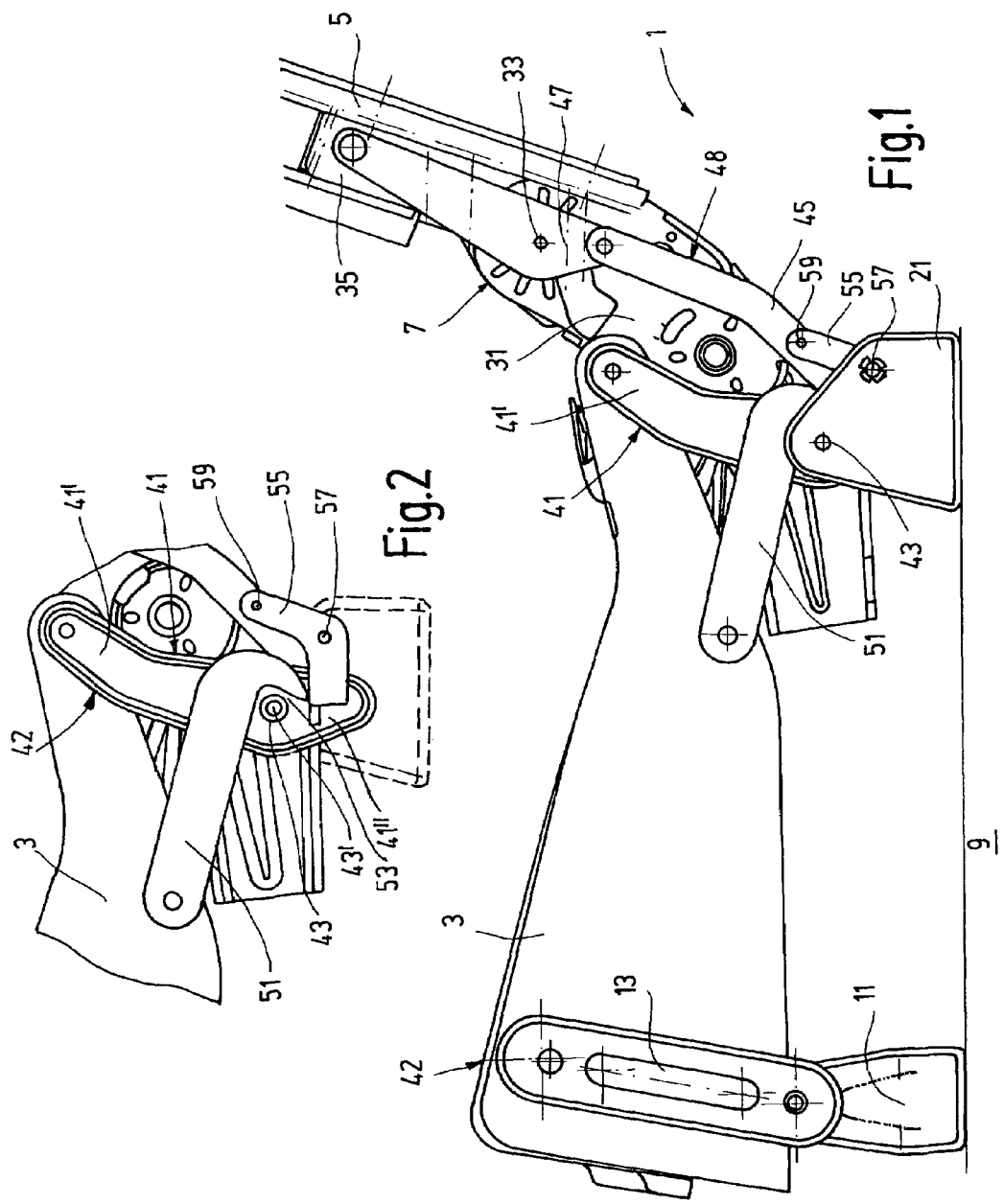

VEHICLE SEAT WITH LOWERED POSITION

RELATED APPLICATION

The present invention claims priority to DE 10 2005 060 444.7, which was filed Dec. 17, 2005. The entire disclosure of DE 10 2005 060 444.7 is incorporated herein by reference.

BACKGROUND OF THE INVENTION

The present invention relates to a vehicle seat, in particular a motor vehicle seat, with a seat part that is linked to a support via a cushion-four-joint, a backrest that can be tilted and locked by at least one fitting and that is coupled to the cushion-four-joint through a link-four-joint, and a linking member is a common component of both four-joints, wherein the vehicle seat at a minimum can be converted from at least one in-use position, which is suited for passenger transport, to a folded together, not-in-use position.

The second and/or the third row of seats of multi-purpose vehicles (MPVs), such as, for example, vans or stretch limousines, are typically designed in such a way that the passenger compartment can be adjusted for the transport of people or goods. For example, WO 01/19640 A2 and U.S. Pat. No. 6,595,588 discloses a vehicle seat of the type described immediately above, with the vehicle seat including two four-joints so that the vehicle seat can be converted from an in-use position to a not-in-use position for the facilitation of entering, with a rear base being a common linking member of both four-joints.

BRIEF SUMMARY OF SOME ASPECTS OF THE INVENTION

An aspect of the present invention is the provision of improvements to a vehicle seat of the type mentioned above. In accordance with one aspect of the present invention, a vehicle seat, in particular a motor vehicle seat, includes a seat part that is linked to a support via a cushion-four-joint, a backrest that can be tilted and locked by at least one fitting and that is coupled to the cushion-four-joint through a link-four-joint, and an additional securing device with a leeway. A linking member is a common component of both four-joints, and the vehicle seat can as a minimum be converted from at least one in-use position, which is suited for passenger transport, to a folded together, not-in-use position (e.g., a compacted configuration). The additional securing device is for being between the seat part and the support in the in-use position. The leeway (e.g., structure defining a gap) of the additional securing device is for defining the mobility of the cushion-four-joint in the case of a crash and during a forward tilt adjustment of the backrest. Stated differently, the leeway is for defining at least one predetermined, limited range of motion through which the cushion-four-joint can move in response to each of: the backrest being pivoted forwardly with respect to the seat part while the vehicle seat is in the at least one in-use position, and a crash that occurs while the vehicle seat is in the at least one in-use position.

Because an additional securing device with leeway is provided between the seat part and the base in the in-use position, with the leeway defining the mobility of the cushion-four-joint in the case of a crash and in the case of a tilt adjustment of the backrest towards the front, the safety for the vehicle occupant in the case of a crash can be combined with the comfort of a tilt adjustment of the backrest. In the case of a crash, the forces can be guided directly—after minor deformation of the components—into the support without requiring that the link-four-joint, which is locked by the fitting, be designed to be particularly loadable. The tilt adjustment is not hindered by the leeway.

The common linking member reduces the degrees of freedom, which are present during a coupled movement of the backrest and the seat part, to such an extent that a defined motion takes place. The defined sequence in the drive of the four-joint leads, in the case of a base position (e.g., lowered position) as a not-in-use position, to a lowering of the seat part during the forward tilting of the backrest. The common linking member is preferably constructed as a two-armed lever that is preferably linked by a middle joint. The different arms of the two-armed lever belong to different four-joints, which reduces the number of components and simplifies the assembly as well as the sequence of motions.

The additional securing device with leeway is preferably formed by a catch hook, which can be rotated upwards, and a pin, with the catch hook and pin touching each other for the limiting of the mobility of the cushion-four-joint, i.e., which reduces the leeway (e.g., gap) to zero during the actuation of the securing device. The pin can serve at the same time as a bearing bolt of the middle joint, which reduces the number of components. The catch hook is preferably linked to the seat part in order to be able to divert the forces acting on the seat part in the case of a crash.

Other aspects and advantages of the present invention will become apparent from the following.

BRIEF DESCRIPTION OF THE DRAWINGS

The invention is further explained in the following with reference to an exemplary embodiment shown in the drawings, in which:

FIG. 1 is a side view of a portion of the exemplary embodiment in the in-use position, FIG. 2 is a partial view corresponding to FIG. 1 without the rear base.

DETAILED DESCRIPTION OF EXEMPLARY EMBODIMENT

Figure 3:
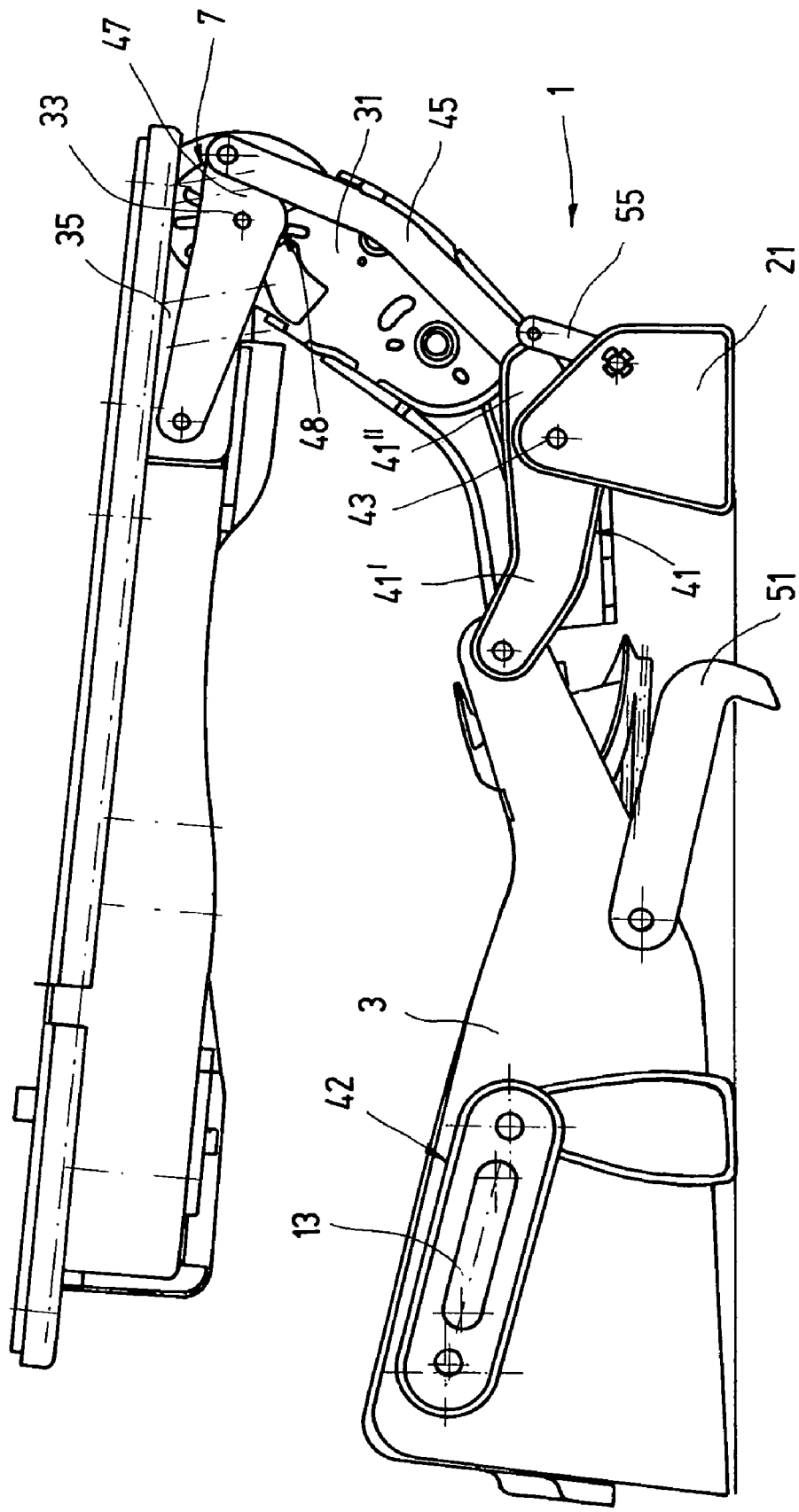
FIG. 3 is a view corresponding to FIG. 1, with the vehicle seat in the base (e.g., lowered) position.

A vehicle seat 1 of the exemplary embodiment of the present invention is typically for a middle or back row of seats in a motor vehicle, for example a van. The vehicle seat 1 includes a seat part 3 and a backrest 5. The seat part 3 and backrest 5 are linked by fittings 7 that can be locked. In particular, the fittings 7 allow for the inclination of the backrest 5 relative to the seat part 3 to be adjusted. In the following directional indications it is assumed that the vehicle seat 1 is arranged in the motor vehicle in the forward traveling direction, whereby the backrest 5 is located at the rear end of the seat part 3 in an in-use position of the vehicle seat 1 that is suitable for passenger transport. In accordance with the exemplary embodiment of the present invention, the seat part 3 is an assembly that includes a support structure and a covered pad (e.g., seat cushion) that is supported by the support structure. In the following Detailed Description section of this disclosure, references to a component being linked (e.g., connected) to the seat part 3 should be understood as meaning that the component is linked to the support structure of the seat part 3.

The right and left sides of the vehicle seat 1 are substantially symmetrical; therefore and for the sake of simplicity, only the left side of the vehicle seat is described in the following. In the following, the vehicle seat 1 will first be described in a special in-use position, namely the design position in which the backrest 5 is tilted backwards, for example at 23° with respect to the vertical, so that a user can comfortably sit in the vehicle seat. A front base 11 is firmly attached to a support 9 that is firmly attached to or is part of the vehicle structure. In a modified embodiment, the front base 11 is detachably attached to the support 9 with a lock or something similar. In the exemplary embodiment, the support 9 is the vehicle's floorboard. In a modified embodiment, the support 9 is a first runner of a pair of relatively movable runners/rails that provide for longitudinal adjustment of the vehicle seat 1, wherein the second runner of the pair is for being firmly attached to the vehicle's structure (e.g., floorboard). The seat part 3 is linked to the front base 11 via a front rocker arm 13 (e.g., a pivotable link). The front rocker arm 13 is provided at both ends with joints (e.g. pivots), one of which forms the pivotable linkage of the front rocker arm 13 to the front base 11, and the other of which forms the pivotable connection of the front rocker arm 13 to the front end of the seat part 3.

In addition, a rear base 21 is firmly attached on the support 9 at a position that, with respect to the normal traveling direction, is behind the front base 11. In a modified embodiment, the rear base 21 is detachably attached to the support 9 with a lock or something similar. The fitting 7 includes a lower fitting part 31 and an upper fitting part 35. The lower fitting part 31 of the fitting 7 is attached on the rear base 21 (or optionally the support 9). The upper fitting part 35 of the fitting 7 is attached to the backrest 5. The upper fitting part 35 is lockable, and for pivoting around the backrest rotation axis 33 relative to the lower fitting part 31.

A rear rocker arm 41 (e.g., a pivotable link) is constructed as a two-arm lever and is linked directly to the rear base 21 via a middle joint 43 (e.g., pivot) that is located between both arms. The longer first arm 41' of the rear rocker arm 41, which points upwards in the in-use position, is at its end linked (e.g., by a pivot) to the seat part 3, namely on the rear end of the seat part 3. The support 9 with the bases 11 and 21, both of the rocker arms 13 and 41, and the seat part 3 define a cushion-four-joint 42 as a four linking member (e.g., they together define a four-bar linkage that comprises a plurality of links).

The shorter arm 41" of the rear rocker arm 41 points downwards in the in-use position. One end of a link 45 is linked via an additional joint (e.g., pivot) on the second shorter arm 41" of the rear rocker arm 41. The other end of the link 45 is linked via a joint (e.g., pivot) to a third arm 47 (e.g., link). The third arm 47 is connected to the upper fitting part 35 in a torque-proof manner, so that the third arm 47 rotates with the upper fitting part 35. In a modified embodiment, the link 45 may also be linked to another part of the backrest 5.

For adjusting the tilt (e.g., inclination) of the backrest 5, the fitting 7 on each side of the vehicle seat 1 is unlocked, then the backrest 5 is rotated around the backrest rotation axis 33 into the desired position, and then each fitting 7 is again locked. The rear base 21 with the fitting bottom part 31, the third arm 47, the link 45, and the second arm 41" thereby form a link-four-joint 48 as a four linking member (e.g., they together define a four-bar linkage comprising a plurality of links) that forces the rear rocker arm 41 to make a tilting motion around the middle joint 43, thus moving the cushion-four-joint 42. Because of this, the tilting of the seat part 3 also changes and is, in fact, during the tilting forward of the backrest 5 initially flatter, and during the tilting backwards of the backrest 5, steeper.

A catch hook 51 is provided as an additional securing device. The catch hook 51 is linked to the seat part 3 and surrounds on two sides (above and below) a pin 43' which serves as a bearing bolt of the middle joint 43. On the side behind the pin 43' of the middle joint 43, a leeway 53 (e.g., gap) is provided in between this pin 43' and the catch hook 51 in the described design position. This leeway 53 defines the forward mobility (e.g., a limited range of motion) of the cushion-four-joint 42, and contact between a hooked end of the catch hook 51 and the pin 43' limits this mobility (e.g., defines an end of the limited range of motion), namely during the previously described forward tilt adjustment of the backrest 5 as well as in the case of a (frontal) crash. In the latter case, the hooked end of the catch hook 51 arrives at the pin 43' after a plastic deformation of the components in the installation.

An angled release lever 55 is linked to a bearing 57 that is arranged approximately centrally on the rear base 21, so that the release lever 55 is arranged to be with one arm below the catch hook 51, and the release lever is provided with a Bowden cable fastening 59 on the other arm. The release lever 55 can be actuated by a Bowden cable that is attached to the Bowden cable fastening 59, in particular by a linkage to the unlocking of the fitting 7. When the release lever 55 is rotated it lifts the catch hook 51 over the bearing bolt of the middle joint 43, i.e., it unlocks the catch hook 51 (e.g., causes the catch hook 51 to change from an operative configuration to an inoperative configuration).

The backrest 5 is, after the unlocking of the fitting 7 and the catch hook 51, folded forward in order to convert the vehicle seat 1 into a compacted position, or more specifically into a base position (e.g., flat-floor-position) as an excellent not-in-use position in which an enlarged load space is available. For example, FIG. 3 illustrates an example of the vehicle seat 1 in a compacted configuration in which the seat part 3 and the backrest 5 are in a substantially folded configuration with respect to one another. Similar to the case of the tilt adjustment, the link-four-joint 48 forces the rear rocker arm 41 to make a rotation around the middle joint 43, and thereby moves the cushion-four-joint 42, initially making the seat part 3 flatter. When the rear rocker arm 41 with the joint on the seat part 3 has exceeded the highest point of its trajectory, the link-four-joint 48 starts to lower the cushion-four-joint 42 and thereby the seat part 3, due to the forward motion of the rear rocker arm 41. On the approach to the lowered base position, in which the backside of the backrest 5 is at least approximately horizontal, the backrest lies down on (or comes close to lying down on) the seat part 3. The securing of this folded together, lowered base position results from the locking of the fitting 7. The return to the previously utilized in-use position takes place after the release of the fitting 7 in a reversed sequence of the described steps.

A fitting 7 and/or a catch hook 51 is provided only on one of the vehicle seat sides in a modified embodiment, and then preferably on vehicle seat sides that are opposite to each other.

It will be understood by those skilled in the art that while the present invention has been discussed above with reference to an exemplary embodiment, various additions, modifications and changes can be made thereto without departing from the spirit and scope of the invention as set forth in the following claims.

That which is claimed:

1. A vehicle seat for being mounted to a support, the vehicle seat comprising:
   a seat part;
   a backrest;
   at least one fitting that is operative so that the backrest can be pivoted and locked with respect to the seat part;
   a first plurality of links for pivotably linking the seat part to the support;

a second plurality of links, wherein
  (a) the backrest is coupled to the first plurality of links by way of elements, with the elements comprising the second plurality of links,
  (b) the first plurality of links includes a linking member,
  (c) the second plurality of links also includes the linking member,
  (d) the vehicle seat can at least be converted from at least one use position to a compacted position,
  (e) the backrest extends upwardly from proximate a rear edge of the seat part and the seat part extends forwardly from proximate a lower edge of the backrest while the vehicle seat is in the at least one use position, so that a user can sit in the vehicle seat while the vehicle seat is in the at least one use position, and
  (f) the backrest and the seat part are in a substantially folded configuration with respect to one another in the compacted position; and
a releasable securing device for being between the seat part and the support while the vehicle seat is in the at least one use position, wherein the securing device comprises a leeway for defining at least one predetermined, limited range of motion through which the first plurality of links can move in response to each of
  (a) the backrest being pivoted forwardly with respect to the seat part while the vehicle seat is in the at least one use position, and
  (b) a crash that occurs while the vehicle seat is in the at least one use position,
wherein the securing device comprises a pivotably mounted catch hook and a pin, the catch hook and the pin touch each other to restrict movement of the first plurality of links and thereby define an end of the limited range of motion, and the leeway comprises a gap between the pin and an end region of the catch hook.

2. The vehicle seat according to claim 1 in combination with the support, wherein:
the seat part is pivotably linked to the support by way of the first plurality of links so that the seat part, the support and the first plurality of links are for operating like a four-bar linkage;
the first plurality of links includes a rear base;
the rear base is connected to the support; and
the linking member, which is part of both of the first and second plurality of links, is linked to the rear base by a middle joint that comprises the pin.

3. The combination according to claim 2, wherein:
the linking member, which is part of both of the first and second plurality of links, is a lever;
the lever includes a first arm and a second arm;
the first arm is part of the first plurality of links; and
the second arm is part of the second plurality of links.

4. The combination according to claim 3, wherein the middle joint is located at a positioned that is between the first arm and the second arm.

5. The vehicle seat according to claim 1, wherein:
the linking member, which is part of both of the first and second plurality of links, is a lever;
the lever includes a first arm and a second arm;
the first arm is part of the first plurality of links; and
the second arm is part of the second plurality of links.

6. The vehicle seat according to claim 5, wherein the middle joint is located at a positioned that is between the first arm and the second arm.

7. The vehicle seat according to claim 1, wherein:
the first plurality of links includes a rear base;
the rear base is for being connected to the support; and
the linking member, which is part of both of the first and second plurality of links, is linked to the rear base by the pin.

8. The vehicle seat according to claim 1, wherein the catch hook is linked to the seat part.

9. The vehicle seat according to claim 1, wherein:
the leeway is defined while the catch hook is in an operative configuration, so that the leeway defines the limited range of motion while the catch hook is in the operative configuration;
at least the securing device, the first plurality of links and the second plurality of links are cooperative so that the vehicle seat is restricted from being converted from the at least one use position to the compacted position while the catch hook is in the operative configuration; and
the vehicle seat further comprises a release lever that is pivotably mounted for lifting the catch hook out of the operative configuration in response to the release lever being actuated, so that the vehicle seat can thereafter be converted from the at least one use position to the compacted position.

10. The vehicle seat according to claim 1, wherein while the vehicle seat is converted from the at least one use position to the compacted position, the backrest rotates forward toward the seat part, and the first plurality of links lowers the seat part, whereby the compacted position is a lowered, compacted position.

11. The vehicle seat according to claim 10, wherein while the vehicle seat is converted from the at least one use position to the lowered, compacted position, the second plurality of links, which is driven by the backrest, drives the first plurality of links, which lowers the seat part.

12. The vehicle seat according to claim 1, wherein the elements, which couple the backrest to the first plurality of links, further comprises the seat part.

13. A vehicle seat for being mounted to a support, the vehicle seat comprising:
a seat part;
a backrest;
at least one fitting that is operative so that the backrest can be pivoted and locked with respect to the seat part;
a first plurality of links for pivotably linking the seat part to the support, wherein the first plurality of links includes a linking member;
a second plurality of links, wherein the backrest is coupled to the first plurality of links by way of elements, the elements comprises the second plurality of links, and the second plurality of links also includes the linking member; and
a releasable securing device for being between the seat part and the support, wherein
  (a) the releasable securing device has an operative configuration and at least one other configuration;
  (b) the vehicle seat can at least be converted from at least one use position to a compacted position while the securing device is in the other configuration,
  (c) the backrest extends upwardly from proximate a rear edge of the seat part and the seat part extends forwardly from proximate a lower edge of the backrest while the vehicle seat is in the at least one use position, so that a user can sit in the vehicle seat while the vehicle seat is in the at least one use position, and
  (d) the backrest and the seat part are in a substantially folded configuration with respect to one another in the compacted position; and
  (e) the securing device is configured, while the securing device is in the operative configuration, for defining at least one predetermined, limited range of motion through which the first plurality of links can move in response to each of
  (1) the backrest being pivoted forwardly with respect to the seat part while the vehicle seat is in the at least one use position, and
  (2) a crash that occurs while the vehicle seat is in the at least one use position, and
(f) at least the securing device, the first plurality of links and the second plurality of links are cooperative so that the vehicle seat is restricted from being converted from the at least one use position to the compacted position while the securing device is in the operative configuration, wherein the securing device comprises a first part and a second part, the first and second parts touch each other to restrict movement of the first plurality of links and thereby define an end of the limited range of motion, there is a predetermined gap between the first part of the securing device and the second part of the securing device, the gap at least partially defines the limited range of motion, the first part of the securing device comprises a catch hook, and the second part of the securing device comprises a bolt.

14. The vehicle seat according to claim 13, wherein:
the first plurality of links includes a rear base;
the rear base is for being connected to the support; and
the linking member, which is part of both of the first and second plurality of links, is linked to the rear base by the bolt.

15. The vehicle seat according to claim 13, wherein the catch hook is pivotably mounted to the seat part.

16. The vehicle seat according to claim 13, wherein the elements, which couple the backrest to the first plurality of links, further comprises the seat part.

* * * * *